United States Patent
Ryu et al.

(10) Patent No.: US 12,463,287 B2
(45) Date of Patent: Nov. 4, 2025

(54) SECONDARY BATTERY AND SEALING BLOCK

(71) Applicant: LG Energy Solution, Ltd., Seoul (KR)

(72) Inventors: Ji Hoon Ryu, Daejeon (KR); Eun Ju Lee, Daejeon (KR); Seok Koo Kim, Daejeon (KR); Ji Eun Lee, Daejeon (KR); Soon Ju Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 804 days.

(21) Appl. No.: 17/772,847

(22) PCT Filed: Aug. 26, 2020

(86) PCT No.: PCT/KR2020/011399
§ 371 (c)(1),
(2) Date: Apr. 28, 2022

(87) PCT Pub. No.: WO2021/096035
PCT Pub. Date: May 20, 2021

(65) Prior Publication Data
US 2022/0393299 A1    Dec. 8, 2022

(30) Foreign Application Priority Data
Nov. 13, 2019   (KR) .................. 10-2019-0145286

(51) Int. Cl.
*H01M 50/342*   (2021.01)
*H01M 50/105*   (2021.01)
*H01M 50/186*   (2021.01)

(52) U.S. Cl.
CPC ..... *H01M 50/3425* (2021.01); *H01M 50/105* (2021.01); *H01M 50/186* (2021.01)

(58) Field of Classification Search
CPC ............. H01M 50/183; H01M 50/184; H01M 50/186; H01M 50/3425
See application file for complete search history.

(56) References Cited

U.S. PATENT DOCUMENTS

| | | |
|---|---|---|
| 2002/0157242 A1 | 10/2002 | Fukuda et al. |
| 2006/0051658 A1 | 3/2006 | Otohata et al. |

(Continued)

FOREIGN PATENT DOCUMENTS

| | | |
|---|---|---|
| CN | 103187177 A | 7/2013 |
| CN | 103975461 A | 8/2014 |

(Continued)

OTHER PUBLICATIONS

European Search Report issued in Appln. No. 20888675.4 mailed Jun. 19, 2024 (7 pages).

(Continued)

*Primary Examiner* — Nathanael T Zemui
(74) *Attorney, Agent, or Firm* — Lerner David LLP

(57) ABSTRACT

A secondary battery according to an embodiment of the present disclosure may include an electrode assembly and a pouch-type batter. The battery case may include a cup part to accommodate electrode assembly. A sealing part may extend outward from an edge of the cup part and may be sealed. A venting device may be inserted into the sealing part through which a gas inside the cup part may be discharged to the outside. The sealing part may include a vent sealing portion into which the venting device may be inserted, and a weak sealing portion which may be positioned between the vent sealing portion and the cup part and sealed more weakly than the periphery thereof.

11 Claims, 8 Drawing Sheets

(56) References Cited

U.S. PATENT DOCUMENTS

| | | |
|---|---|---|
| 2008/0233468 A1 | 9/2008 | Otohata et al. |
| 2009/0081542 A1* | 3/2009 | Yageta ............... H01G 9/08 |
| | | 429/185 |
| 2010/0112436 A1 | 5/2010 | Mizuta et al. |
| 2012/0064381 A1 | 3/2012 | Yageta et al. |
| 2014/0272488 A1 | 9/2014 | Kim et al. |
| 2016/0036024 A1 | 2/2016 | Choi et al. |
| 2018/0047950 A1 | 2/2018 | Lim et al. |
| 2018/0114964 A1* | 4/2018 | Kim ............... H01M 50/172 |
| 2018/0241023 A1 | 8/2018 | Lim et al. |
| 2020/0028128 A1 | 1/2020 | Hwang et al. |
| 2020/0235360 A1 | 7/2020 | Lim et al. |

FOREIGN PATENT DOCUMENTS

| | | |
|---|---|---|
| CN | 206388735 U | 8/2017 |
| CN | 107408720 A | 11/2017 |
| JP | 2006-054099 A | 2/2006 |
| JP | 2006-079858 A | 3/2006 |
| JP | 2007-087922 A | 4/2007 |
| JP | 2011-258570 A | 12/2011 |
| KR | 20030044257 A | 6/2003 |
| KR | 100822190 B1 | 4/2008 |
| KR | 20090076364 A | 7/2009 |
| KR | 10-2009-0121353 A | 11/2009 |
| KR | 101074022 B1 | 10/2011 |
| KR | 101128664 B1 | 3/2012 |
| KR | 20120060314 A | 6/2012 |
| KR | 101292284 B1 | 8/2013 |
| KR | 20140055641 A | 5/2014 |
| KR | 101459179 B1 | 11/2014 |
| KR | 20160014828 A | 2/2016 |
| KR | 20160046477 A | 4/2016 |
| KR | 20160111614 A | 9/2016 |
| KR | 20160133041 A | 11/2016 |
| KR | 101722408 B1 | 4/2017 |
| KR | 20170049014 A | 5/2017 |
| KR | 20170068332 A | 6/2017 |
| KR | 20180106407 A | 10/2018 |
| KR | 20190042953 A | 4/2019 |
| KR | 20190126618 A | 11/2019 |
| WO | 2004-010517 A1 | 1/2004 |
| WO | 2006098242 A1 | 9/2006 |

OTHER PUBLICATIONS

International Search Report for Application No. PCT/KR2020/011399 dated Dec. 2, 2020, 2 pgs.

\* cited by examiner

SECONDARY BATTERY AND SEALING BLOCK

CROSS-REFERENCE TO RELATED APPLICATIONS

The present application is a national phase entry under 35 U.S.C. § 371 of International Application No. PCT/KR2020/011399 filed on Aug. 26, 2020, which claims the benefit of the priority of Korean Patent Application No. 10-2019-0145286, filed on Nov. 13, 2019, the disclosures of all of which are hereby incorporated by reference in their entirety.

TECHNICAL FIELD

The present invention relates to a secondary battery and a sealing block and, more specifically, to a secondary battery in which a venting device is inserted into a sealing part which may regulate pressure by discharging to the outside a gas present inside a cup part when internal pressure thereof increases, and a sealing block which seals the secondary battery.

BACKGROUND ART

In general, as types of secondary batteries, there are nickel-cadmium batteries, nickel-hydrogen batteries, lithium ion batteries, and lithium ion polymer batteries. Such secondary batteries are being used for large products requiring a high output such as electric vehicles or hybrid electric vehicles, and power storage devices or backup-power storage devices for storing surplus generated power and renewable energy, as well as small products such as digital cameras, P-DVDs, MP3 players, cellular phones, PDAs, portable game devices, power tools, and E-bikes.

The secondary battery is classified into a pouch type, a can type, or the like according to a material of a case that accommodates an electrode assembly. In the pouch type, the electrode assembly is accommodated in a pouch made of a flexible polymer material. Also, in the can type, the electrode assembly is accommodated in a case made of a metal, a plastic material, or the like.

Here, the secondary battery is vulnerable to safety due to various problems such as electrolyte decomposition or thermal runaway phenomenon caused by heat generation from an internal short circuit by external impact, overcharging, over-discharging, or the like. In particular, when the pressure inside the secondary battery increases as a gas is generated due to the electrolyte decomposition, the secondary battery may explode.

In detail, when the secondary battery is charged and discharged repeatedly, a gas is generated through an electrochemical reaction by an electrolyte and an electrode active material. Here, the generated gas increases the internal pressure of the secondary battery and thus causes problems such as weakening of a bonding force between components, damage of a case of the secondary battery, an early operation of a protection circuit, deformation of an electrode, an internal short circuit, explosion, and the like. Accordingly, protection members such as a current interrupt device (CID) filter and a safety vent are provided in the can-type secondary battery, and thus, when the pressure within the case increases, electrical connection are physically interrupted. However, the protection members are not sufficiently provided in the pouch-type secondary battery according to the related art.

DISCLOSURE OF THE INVENTION

Technical Problem

The object of the present invention is to provide a secondary battery in which a venting device is inserted into a sealing part which may regulate pressure by discharging to the outside a gas present inside a cup part when internal pressure thereof increases, and a sealing block which seals the secondary battery.

The objectives of the present invention are not limited to the aforesaid, but other objectives not described herein will be clearly understood by those skilled in the art from descriptions below.

Technical Solution

A secondary battery according to an embodiment of the present invention for achieving the object includes: an electrode assembly formed by stacking an electrode and a separator; and a battery case which is a pouch type and accommodates the electrode assembly therein, wherein the battery case includes: a cup part provided with an accommodation space that accommodates the electrode assembly therein; a sealing part which extends outward from an edge of the cup part and is sealed as upper and lower portions thereof come into contact with each other; and a venting device which is inserted into the sealing part and through which a gas inside the cup part is discharged to the outside, wherein the sealing part includes: a vent sealing portion into which the venting device is inserted; and a weak sealing portion which is positioned between the vent sealing portion and the cup part and sealed relatively more weakly than the periphery thereof.

Also, the weak sealing portion may have a width corresponding to a width of the vent sealing portion.

A sealing block according to an embodiment of the present invention for achieving the object seals a sealing part of a pouch-type secondary battery. The sealing block includes: a main body; and a groove which is recessed inward from a sealing surface of the main body that comes into direct contact with the sealing part, wherein the groove includes: a vent groove into which is inserted a venting device that discharges a gas inside a cup part of the pouch-type secondary battery to the outside and which seals the venting device together with the sealing part; and a weak sealing groove which is positioned between the vent groove and the cup part when the sealing surface comes into contact with the sealing part.

Also, the groove may further include a lead groove into which is inserted an electrode lead that supplies electricity to the outside of the pouch-type secondary battery, and which seals the electrode lead together with the sealing part.

Also, the weak sealing groove may have a height less than that of the lead groove.

Also, the lead groove may be formed, in a width direction of the sealing surface, from a first edge which is formed in a longitudinal direction of the sealing surface.

Also, the lead groove may extend to a second edge that faces the first edge.

Also, the weak sealing groove may have a width corresponding to a width of the vent groove.

Also, the weak sealing groove may be formed from a first edge, which is formed in a longitudinal direction of the sealing surface, to the vent groove.

Also, the main body may have a width greater than or equal to a width of the sealing part and may have a length greater than or equal to a length of the sealing part.

Also, the main body may further include a cylinder which is disposed above the weak sealing groove, moves linearly in a vertical direction, and adjusts a height of the weak sealing groove.

Other specific features of the present invention are included in the detailed description and drawings.

Advantageous Effects

According to the embodiments of the present invention, at least the following effects may be obtained.

The venting device is inserted into the sealing part. Thus, when the pressure inside the cup part of the secondary battery increases, the gas present therein may be discharged to the outside to regulate the pressure.

Also, the weak sealing portion, which is sealed relatively more weakly than the periphery thereof, is formed between the cup part and the vent sealing portion into which the venting device is inserted. Thus, when the pressure inside the cup part increases, the explosion of the secondary battery may be prevented by inducing the detachment of the sealing part toward the venting device.

Also, the sealing block that seals the secondary battery includes the vent groove for sealing the venting device and the weak sealing groove. Thus, the vent sealing portion and the weak sealing portion may be easily formed.

The effects according to the present invention are not limited to those exemplified above, and more various effects are included in the present specification.

MODE FOR CARRYING OUT THE INVENTION

Figure 1:
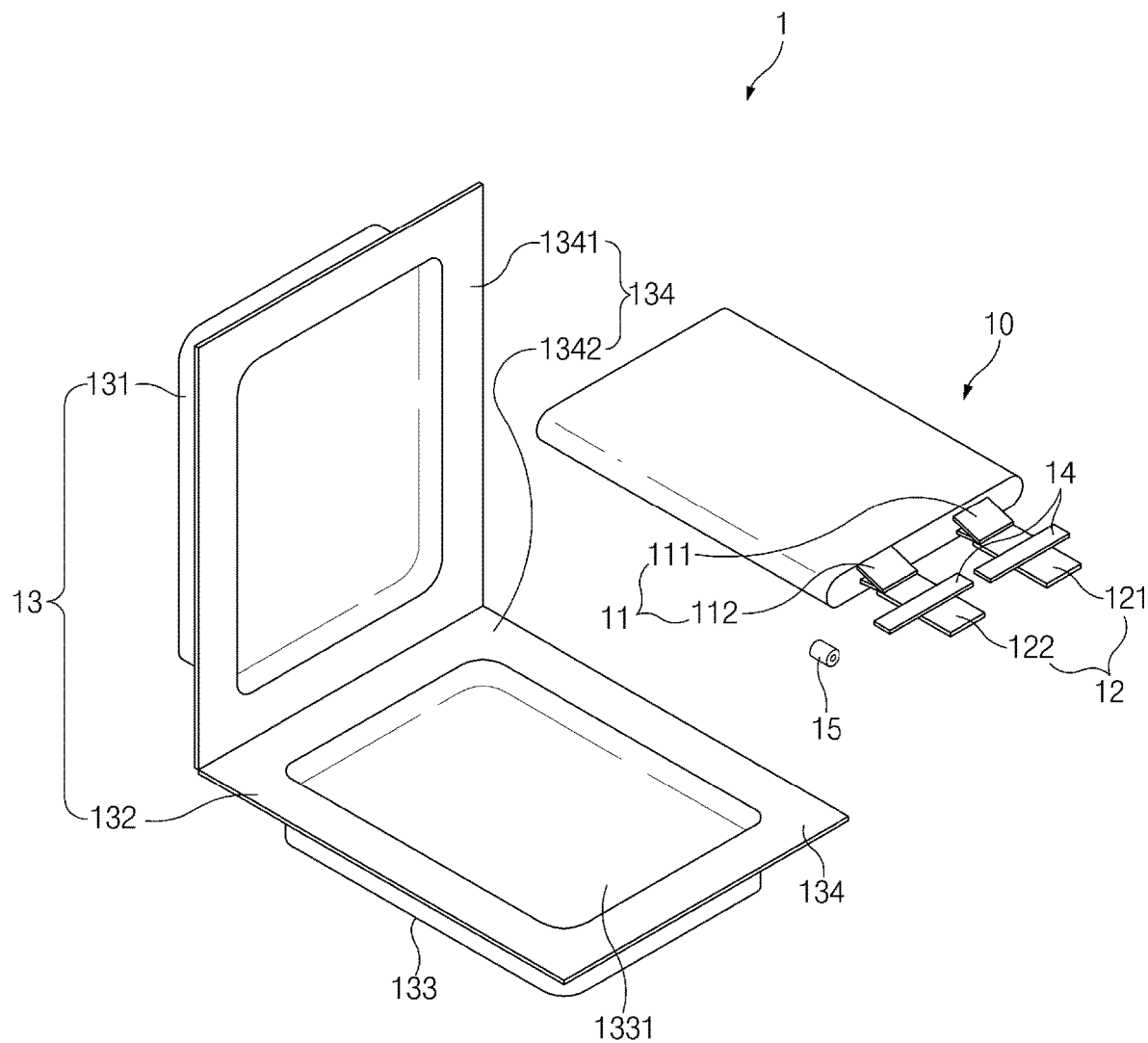
FIG. 1 is an assembly view of a secondary battery according to an embodiment of the present invention.

Advantages and features of the present invention, and implementation methods thereof will be clarified through following embodiments described in detail with reference to the accompanying drawings. The present invention may, however, be embodied in various different forms and should not be construed as limited to the embodiments set forth herein. Rather, these embodiments are provided so that this disclosure will be thorough and complete, and will fully convey the scope of the present invention to those skilled in the art. Further, the present invention is defined only by scopes of claims. Like reference numerals refer to like elements throughout.

Unless otherwise defined, all terms (including technical and scientific terms) used herein have the same meaning as commonly understood by one of ordinary skill in the art to which the present invention belongs. Also, terms as defined in a generally used dictionary are not construed ideally or excessively unless defined apparently and specifically.

In this specification, the terms are used only for explaining embodiments while not limiting the present invention. In this specification, the singular forms include the plural forms as well, unless the context clearly indicates otherwise. The meaning of "comprises" and/or "comprising" used in the specification does not exclude the presence or addition of one or more components other than the mentioned component(s).

Hereinafter, preferred embodiments of the present invention will be described in detail with reference to the accompanying drawings.

Figure 2:
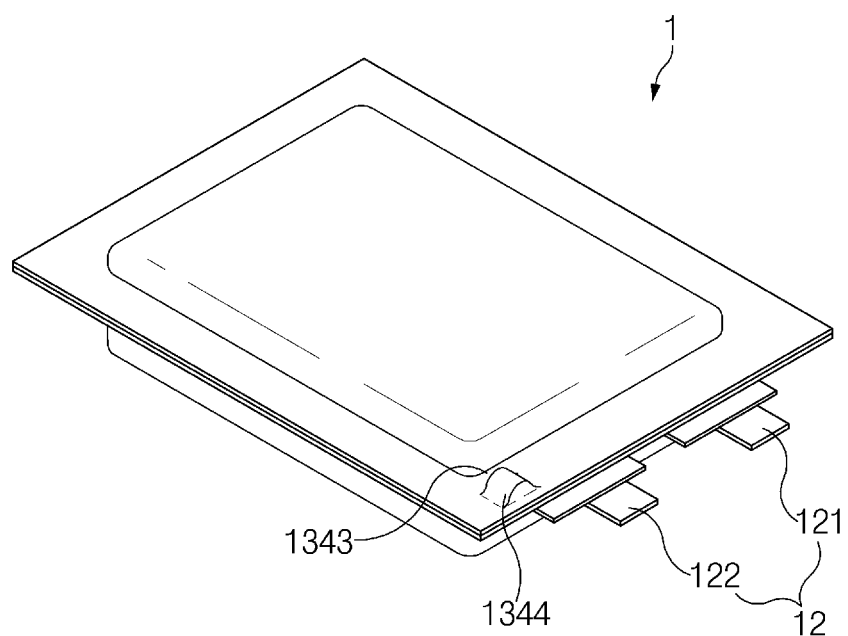
FIG. 2 is a perspective view of the secondary battery of FIG. 1.

FIG. 1 is an assembly view of a secondary battery 1 according to an embodiment of the present invention, and FIG. 2 is a perspective view of the secondary battery 1 according to an embodiment of the present invention.

A process of manufacturing a pouch-type secondary battery 1 is as follows. First, slurry, in which an electrode active material, a binder, and a plasticizer are mixed, is applied to a positive electrode collector and a negative electrode collector to manufacture electrodes such as a positive electrode and a negative electrode. Then, the positive electrode and the negative electrode are stacked on both sides of a separator to form an electrode assembly 10 having a predetermined shape. Subsequently, the electrode assembly 10 is inserted into a battery case 13, an electrolyte is injected therein, and the battery case is sealed.

The electrode assembly 10 may be formed by stacking the electrodes and the separator. Particularly, the electrode assembly 10 includes two types of electrodes such as a positive electrode and a negative electrode and a separator interposed between the electrodes to insulate the electrodes from each other. The electrode assembly 10 has a stacking type, a jelly roll type, or a stacking and folding type. The two types of electrodes, that is, the positive electrode and the negative electrode have structures in which active material slurry is applied to the electrode collectors having metal foil or metal mesh shapes including aluminum and copper, respectively. The slurry may be generally formed by mixing granular active materials, subsidiary conductors, binders, plasticizers, and the like in a state where a solvent is added. The solvent is removed during a subsequent process.

The electrode assembly 10 includes an electrode tab 11 as illustrated in FIG. 1. The electrode tab 11 protrudes from each of the positive electrode and the negative electrode of the electrode assembly 10 and serves as a path through which electrons may move between the inside and the outside of the electrode assembly 10. The collector of the electrode assembly 10 includes a portion which is coated with the electrode active material and an end portion, that is, a non-coating portion which is not coated with the electrode active material. Also, the electrode tab 11 may be formed by cutting the non-coating portion or formed by connecting a separate conductive member to the non-coating portion through ultrasonic welding or the like. Although the electrode tab 11 may protrude from one side of the electrode assembly 10 side by side in the same direction as illustrated in FIG. 1, the embodiment is not limited thereto. The electrode tab 11 may protrude in different directions.

An electrode lead 12, which supplies electricity to the outside of the secondary battery 1, is connected to the electrode tab 11 of the electrode assembly 10 through spot welding or the like. Also, a portion of the electrode lead 12 is surrounded by an insulation part 14. The insulation part 14 is positioned being limited to a sealing part 134, in which an upper case 131 and a lower case 132 of the battery case 13 are heat-fused, and is bonded to the battery case 13. Also, the electricity generated from the electrode assembly 10 is prevented from flowing to the battery case 13 through the electrode lead 12, and the sealing of the battery case 13 is maintained. Thus, the insulation part 14 is manufactured from a non-conductor having non-conductivity in which the electricity does not flow well. Generally, although relatively thin insulating tape easily attached to the electrode lead 12 is widely used as the insulation part 14, the embodiment is not limited thereto. Various members may be used as long as the members are capable of insulating the electrode lead 12.

The electrode lead 12 includes a positive electrode lead 121 which has one end connected to a positive electrode tab 111 and extends in a direction in which the positive electrode tab 111 protrudes and a negative electrode lead 122 which has one end connected to a negative electrode tab 112 and extends in a direction in which the negative electrode tab 112 protrudes. Here, the other ends of both the positive electrode lead 121 and the negative electrode lead 122 protrude outward from the battery case 13 as illustrated in FIG. 1. Accordingly, the electricity generated inside the electrode assembly 10 may be supplied to the outside. Also, since the positive electrode tab 111 and the negative electrode tab 112 protrude in various directions, the positive electrode lead 121 and the negative electrode lead 122 may extend in various directions, respectively.

The positive electrode lead 121 and the negative electrode lead 122 may have materials different from each other. That is, the positive electrode lead 121 may have the same aluminum (Al) material as the positive electrode collector, and the negative electrode lead 122 may have the same copper (Cu) material or nickel (Ni)-coated copper material as the negative electrode collector. Also, a portion of the electrode lead 12 protruding outward from the battery case 13 serves as a terminal part and is electrically connected to an external terminal.

The battery case 13 is a pouch which accommodates the electrode assembly 10 therein and is manufactured from a flexible material. Hereinafter, the battery case 13 will be described as being the pouch. The battery case 13 is sealed after the electrode assembly 10 is accommodated so that a portion of the electrode lead 12, i.e., the terminal part is exposed. The battery case 13 includes the upper case 131 and the lower case 132 as illustrated in FIG. 1. The lower case 132 includes a cup part 133 to provide an accommodation space 1331 in which the electrode assembly 10 may be accommodated, and the upper case 131 covers the accommodation space 1331 from above so that the electrode assembly 10 is not separated to the outside of the battery case 13. Here, as illustrated in FIG. 1, the upper case 131 also includes the cup part 133 in which the accommodation space 1331 is provided, and thus, the electrode assembly 10 may be accommodated in an upper portion. Although the upper case 131 and the lower case 132 may be manufactured such that one sides thereof are connected to each other as illustrated in FIG. 1, the embodiment is not limited thereto. The cases may be diversely manufactured, for example, individually manufactured and separated from each other.

According to the present invention, as illustrated in FIG. 1, a venting device 15 is inserted between two surfaces of the sealing part 134 and then heat-fused together. The venting device 15 includes a path through which the inside and outside of the battery case 13 communicate with each other, and regulates pressure by discharging a gas from inside to the outside when internal pressure of the cup part 133 of the battery case 13 increases. Also, the path may be a path allowing only one-way movement. Thus, the gas may be discharged from the inside to the outside through the path, but outside moisture and other foreign materials may not be allowed to enter the inside through the path.

When the sealing part 134 is sealed, an upper sealing portion 1341 provided on an edge of the upper case 131 and a lower sealing portion 1342 provided on an edge of the lower case 132 come into contact with each other to establish sealing. Here, the venting device 15 is inserted between the upper sealing portion 1341 and the lower sealing portion 1342 which come into contact with each other. Also, when the upper sealing portion 1341 and the lower sealing portion 1342 are heat-fused, the venting device 15 is also heat-fused together and fixed inside the sealing part 134.

When the electrode lead 12 is connected to the electrode tab 11 of the electrode assembly 10, and the insulation part 14 is provided on the portion of the electrode lead 12, the electrode assembly 10 is accommodated in the accommodation space 1331 provided in the cup part 133 of the lower case 132, and the upper case 131 covers the space from above. Then, the electrolyte is injected to the inside, and the sealing part 134 that extends outward from the edges of the upper case 131 and the lower case 132 is sealed. The electrolyte is to move lithium ions generated by an electrochemical reaction of the electrode during charging and discharging of the secondary battery 1. Also, the electrolyte may include a non-aqueous organic electrolyte, which is a mixture of a lithium salt and a high-purity organic solvent, or may include a polymer using a polymer electrolyte. Through the method described above, the pouch-type secondary battery 1 may be manufactured as illustrated in FIG. 2.

Figure 3:
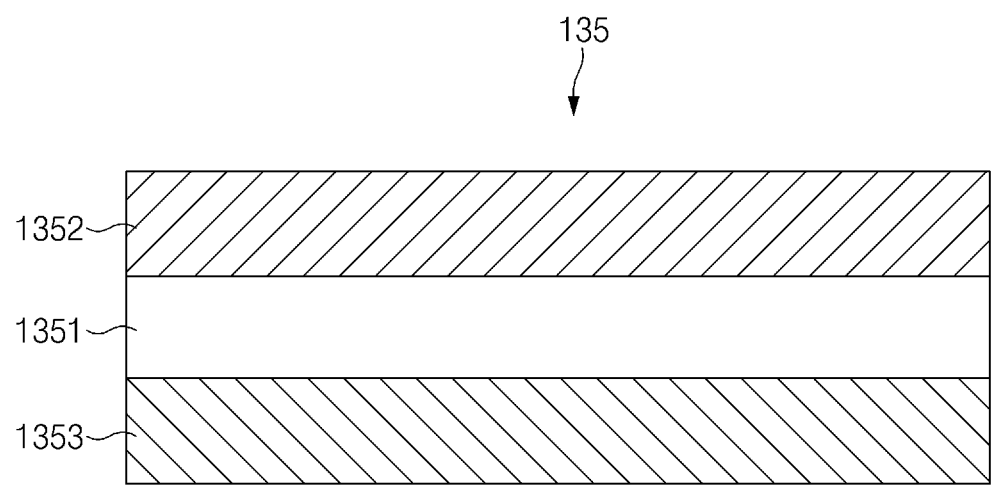
FIG. 3 is a cross-sectional view of a pouch film for constituting a battery case according to an embodiment of the present invention.

FIG. 3 is a cross-sectional view of a pouch film 135 for constituting the battery case 13 according to an embodiment of the present invention.

The battery case 13 is manufactured by drawing the pouch film 135. That is, the battery case 13 is manufactured by stretching the pouch film 135 and forming the cup part 133. As illustrated in FIG. 3, the pouch film 135 includes a gas barrier layer 1351, a surface protection layer 1352, and a sealant layer 1353.

The gas barrier layer 1351 ensures the mechanical strength of the battery case 13, blocks a gas or moisture entering from the outside of the secondary battery 1, and prevents an electrolyte from leaking. Generally, the gas barrier layer 1351 includes a metal, and an aluminum foil is mainly used. The aluminum may be lightweight while ensuring a predetermined level or more of the mechanical strength, and also may supplement electrochemical properties by the electrode assembly 10 and the electrolyte and ensure heat radiation or the like. However, the embodiment is not limited thereto, and the gas barrier layer 1351 may include various materials. For example, the materials may be one or a mixture of two or more selected from the group consisting of iron (Fe), carbon (C), chrome (Cr), manganese (Mn), nickel (Ni), and aluminum (Al). Here, when the gas barrier layer 1351 is made of a material containing iron, the mechanical strength is improved, and when made of a material containing aluminum, the flexibility is enhanced. Thus, the material may be used, by taking into consideration each characteristic thereof.

The surface protection layer 1352 is made of a polymer, is positioned as an outermost layer, and electrically insulates the electrode assembly 10 from the outside while protecting the secondary battery 1 from friction and collision with the outside. Here, the outermost layer represents a layer which is in a direction toward the outside of the gas barrier layer 1351, that is, in the direction toward the side opposite to the electrode assembly 10. The surface protection layer 1352 may include one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. In particular, polymers having the wear resistance and thermal resistance such as nylon resin or polyethylene terephthalate (PET) are mainly used. Also, the surface protection layer 1352 may have a single layer structure which is made of one material or a composite layer structure in which two or more materials respectively constitute layers.

The sealant layer 1353 is made of a polymer, is positioned as an innermost layer, and is in direct contact with the electrode assembly 10. When the pouch film 135 having the stack structure described above is drawn using a punch or the like, a portion thereof is stretched to form the cup part 133 that includes the accommodation space 1331 having a bag shape, and accordingly, the pouch-type battery case 13 is manufactured. Also, when the electrode assembly 10 is accommodated in the inside of the accommodation space 1331, the electrolyte is injected. Subsequently, the upper case 131 and the lower case 132 are brought into contact with each other, and the sealing part 134 is heat-pressed. Accordingly, the sealant layers 1353 are bonded to each other to seal the battery case 13. Here, the sealant layer 1353 has to have insulating characteristics because it is in direct contact with the electrode assembly 10, and also has to have corrosion resistance because it comes into contact with the electrolyte. Also, the sealant layer 1353 has to have high sealing characteristics because it has to completely seal the inside to block the movement of materials between the inside and the outside. The sealing part 134 in which the sealant layers 1353 are bonded to each other has to have excellent thermal bonding strength. Generally, the sealant layer 1353 may include one or more materials selected from the group consisting of polyethylene, polypropylene, polycarbonate, polyethylene terephthalate, polyvinyl chloride, acryl-based polymer, polyacrylonitrile, polyimide, polyamide, cellulose, aramid, nylon, polyester, polyparaphenylene benzobisoxazole, polyarylate, Teflon, and glass fiber. In particular, polyolefin-based resin such as polypropylene (PP) or polyethylene (PE) is mainly used. Since the polypropylene (PP) has excellent mechanical properties such as tensile strength, rigidity, surface hardness, wear resistance, and thermal resistance, and excellent chemical properties such as corrosion resistance, the polypropylene is mainly used to manufacture the sealant layer 1353. In addition, casted polypropylene or polypropylene-butylene-ethylene terpolymer may be used. Also, the sealant layer 1353 may have a single layer structure which is made of one material or a composite layer structure in which two or more materials respectively constitute layers.

Figure 4:
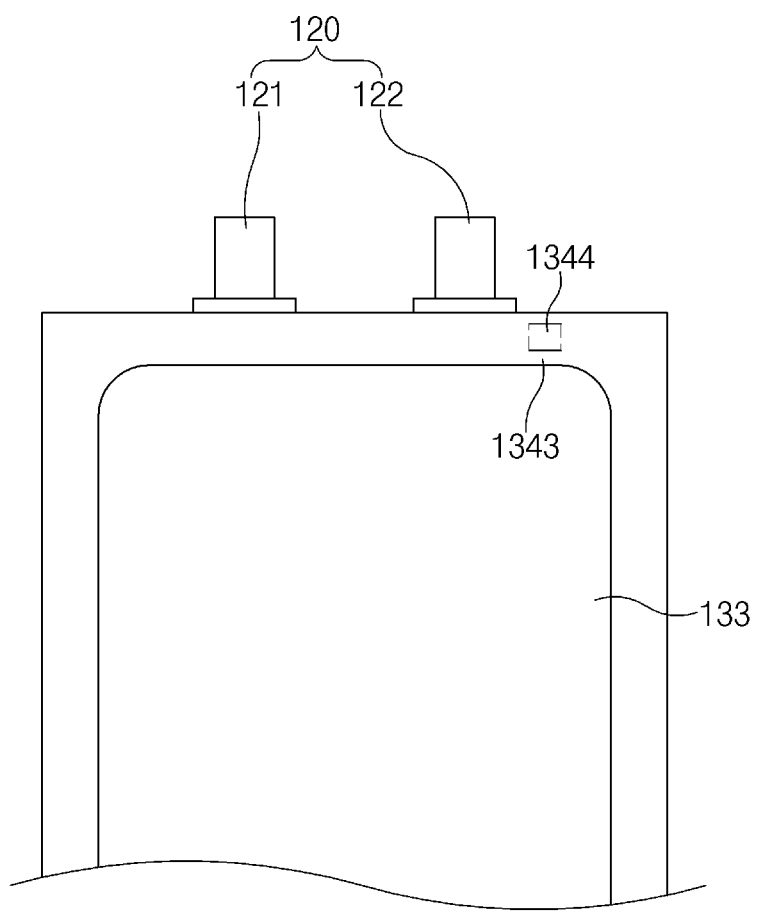
FIG. 4 is an enlarged partial plan view of the secondary battery of FIG. 1.

FIG. 4 is an enlarged plan view of the secondary battery 1 according to an embodiment of the present invention.

According to an embodiment of the present invention, the venting device 15 is inserted into the sealing part 134. Thus, when the pressure inside the cup part 133 of the secondary battery 1 increases, the gas present therein may be discharged to the outside to regulate the pressure. Also, a weak sealing portion 1343, which is sealed relatively more weakly than the periphery thereof, is formed between the cup part 133 and a vent sealing portion 1344 into which the venting device 15 is inserted. Thus, when the pressure inside the cup part 133 increases, the explosion of the secondary battery 1 may be prevented by inducing the detachment of the sealing part 134 toward the venting device 15. Also, a sealing block 2 that seals the secondary battery 1 includes a vent groove 224 for sealing the venting device 15 and a weak sealing groove 223. Thus, the vent sealing portion 1344 and the weak sealing portion 1343 may be easily formed.

For this, the secondary battery 1 according to an embodiment of the present invention includes: an electrode assembly 10 formed by stacking an electrode and a separator; and a battery case 13 which is a pouch type and accommodates the electrode assembly 10 therein. The battery case 13 includes: a cup part 133 provided with an accommodation space 1331 that accommodates the electrode assembly 10 therein; a sealing part 134 which extends outward from an edge of the cup part 133 and is sealed as upper and lower portions thereof come into contact with each other; and a venting device 15 which is inserted into the sealing part 134 and through which a gas inside the cup part 133 is discharged to the outside. The sealing part 134 includes: a vent sealing portion 1344 into which the venting device 15 is inserted; and a weak sealing portion 1343 which is positioned between the vent sealing portion 1344 and the cup part 133 and sealed relatively more weakly than the periphery thereof.

The sealing part 134 includes an upper sealing portion 1341 provided on an edge of an upper case 131 and a lower sealing portion 1342 provided on an edge of a lower case 132. Also, when the upper sealing portion 1341 and the lower sealing portion 1342 are heat-fused while being in contact with each other, the sealing part 134 is sealed to close the inside of the battery case 13.

The venting device 15 is inserted between the upper sealing portion 1341 and the lower sealing portion 1342 which come into contact with each other. Also, as the upper sealing portion 1341 and the lower sealing portion 1342 are heat-fused, the venting device 15 is also heat-fused together and fixed inside the sealing part 134.

When the venting device 15 is fixed inside the sealing part 134, it is desirable that an inlet (not shown) through which a gas flows in faces the cup part 133 of the battery case 13, and an outlet (not shown) through which the gas is discharged faces the outside. Therefore, when a gas is generated inside the cup part 133, the gas may easily flow in the venting device 15 and may be easily discharged to the outside through the venting device 15.

Not only the venting device 15 but also an electrode lead 12 that supplies electricity to the outside of the secondary battery 1 may be inserted between the upper sealing portion 1341 and the lower sealing portion 1342. Thus, according to an embodiment of the present invention, the sealing part 134 includes a lead sealing portion (not shown) into which the electrode lead 12 is inserted and a vent sealing portion 1344 into which the venting device 15 is inserted. Also, the electrode lead 12 and the venting device 15 have their own constant physical volume. Thus, regions of the sealing part 134 in which no component is inserted are formed to be relatively thin and flat, while regions into which the electrode lead 12 and the venting device 15 are inserted are formed to be relatively thick as protruding up and down to ensure a certain volume.

As illustrated in FIG. 4, it is desirable that the length of the venting device 15 is relatively less than the width of the sealing part 134. When the length of the venting device 15 is greater than the width of the sealing part 134, a sealing force of the vent sealing portion 1344 in which the venting device 15 is sealed may be deteriorated.

FIGS. 2 and 4 illustrate that the vent sealing portion 1344 is formed in a region of the sealing part 134 in which the lead sealing portion (not shown) is formed, but it may be formed in various regions of the sealing part 134. However, when a folding surface is formed in a portion of the sealing part 134 as the upper case 131 and the lower case 132 are folded while one sides thereof are connected, even though the venting device 15 is inserted into the sealing part 134 in which the folding surface is formed, it is not easy to discharge the gas inside the secondary battery 1 to the outside due to the folding surface. Therefore, it is desirable that the venting device 15 is not inserted into the sealing part 134 in which the folding surface is formed. When the upper case 131 and the lower case 132 are formed separately from each other while the one sides thereof are not connected, there is no folding surface, and thus, the venting device 15 may be formed in various regions of the sealing part 134 irrespective of positions.

Generally, the sealing part 134 is strongly sealed and thus is not easily broken due to external impact. Accordingly, the leakage of internal electrolyte or entering of outside moisture and other foreign materials may be minimized. However, in a case where a gas is generated inside the secondary battery 1 due to an internal short circuit, overcharging, or the like, when the sealing part 134 is excessively strongly sealed, the internal pressure of the secondary battery 1 is rapidly increased to cause risk of explosion.

Thus, the sealing part 134 according to an embodiment of the present invention further includes the weak sealing portion 1343 which is positioned between the vent sealing portion 1344 and the cup part 133 and is sealed relatively more weakly than the periphery thereof. The weak sealing portion 1343 is sealed relatively more weakly than other peripheral regions of the sealing part 134. Thus, when the gas is generated inside the cup part 133 of the secondary battery 1 and the internal pressure increases up to a certain level, the pressure is transferred to the weak sealing portion 1343 positioned adjacent to the cup part 133.

Due to the transferred pressure, the weak sealing portion 1343 is detached (separated) to the upper sealing portion 1341 and the lower sealing portion 1342 earlier than other regions of the sealing part 134. The weak sealing portion 1343 is disposed between the vent sealing portion 1344 and the cup part 133, and thus, when the weak sealing portion 1343 is detached, the inlet of the venting device 15 inserted into the vent sealing portion 1344 is open, and the gas may flow in the inlet.

The gas flowing in the inlet of the venting device 15 transfers the internal pressure to the outlet of the venting device 15. Then, an outer region of the vent sealing portion 1344 is detached. The outer region of the vent sealing portion 1344 is narrower than other regions of the sealing part 134, and thus, when the internal pressure further increases, the upper sealing portion 1341 and the lower sealing portion 1342 are detached in the outer region earlier than the other regions of the sealing part 134. Accordingly, the gas is discharged to the outside of the secondary battery 1, and the internal pressure of the secondary battery 1 may be reduced. As described above, the weak sealing portion 1343 is detached earlier than other regions of the sealing part 134 and induces the detachment of the sealing part 134 toward the venting device 15. Accordingly, the explosion of the secondary battery 1 may be prevented.

Even if the weak sealing portion 1343 is not sealed at all, there may be the effect of inducing the detachment of the sealing part 134 toward the venting device 15. However, in a general case where a gas is not generated, the internal pressure of the cup part 133 is maintained at a negative pressure state lower than atmospheric pressure to increase energy density by removing an unnecessary space inside a cell. Also, when a boundary edge between the cup part 133 and the sealing part 134 is uniformly formed along the shape of the cup part 133, the pressure in the negative pressure state is uniformly applied to the edge. However, when the weak sealing portion 1343 is not sealed at all, the boundary edge includes the periphery of the weak sealing portion 1343 and thus formed non-uniformly. Thus, the pressure in the negative pressure state is concentrated on the peripheral region of the weak sealing portion 1343, and thus, the regions may be distorted. Thus, to maintain the uniformity of the boundary edge, it is desirable that the weak sealing portion 1343 is sealed to a certain degree.

It is desirable that the weak sealing portion 1343 has a width corresponding to a width of the vent sealing portion 1344 so that the gas inside the cup part 133 is easily guided to the venting device 15. Here, they correspond to each other represents that they are similar or identical, and it is desirable that a range as being similar includes a very small difference within less than 10% of the width of the vent sealing portion 1344.

Figure 5:
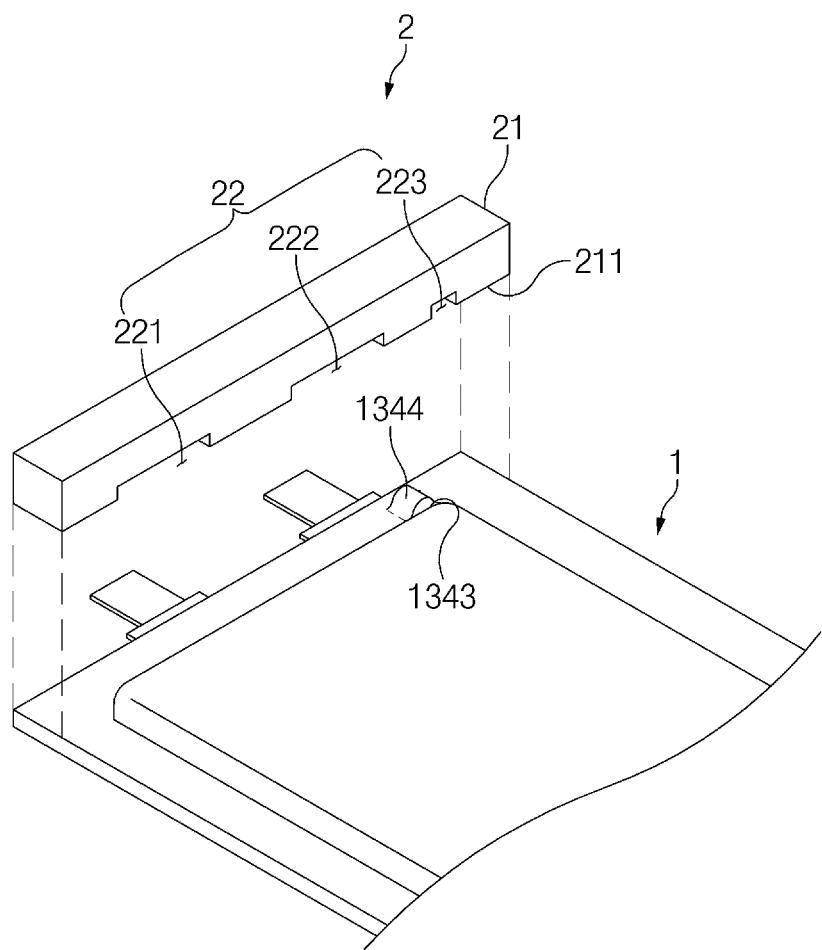
FIG. 5 is a perspective view showing a sealing block of a secondary battery according to an embodiment of the present invention.

FIG. 5 is a perspective view showing a state in which the sealing part 134 of the secondary battery 1 is sealed by a sealing block 2 according to an embodiment of the present invention.

As described above, to seal the sealing part 134, the upper sealing portion 1341 and the lower sealing portion 1342, which are in contact with each other, have to be heat-fused. For this, the sealing block 2 is needed, which comes into direct contact with the sealing part 134 and then applies heat and pressure thereto.

A sealing block 2 according to an embodiment of the present invention seals the sealing part 134 of the pouch-type secondary battery 1. The sealing block 2 includes: a main body 21; and a groove 22 which is recessed inward from a sealing surface 211 of the main body 21 that comes into direct contact with the sealing part 134. The groove 22 includes: a vent groove 224 into which is inserted a venting device 15 that discharges a gas inside a cup part 133 of the secondary battery 1 to the outside and which seals the venting device 15 together with the sealing part 134; and a weak sealing groove 223 which is positioned between the vent groove 224 and the cup part 133 when the sealing surface 211 comes into contact with the sealing part 134.

The sealing block 2 applies the heat and pressure to the sealing part 134 while the sealing surface 211 comes into direct contact therewith. For this, a heating coil that generates heat may be formed in the sealing surface 211 of the sealing block 2, and a driving unit capable of moving the sealing block 2 up and down may also be connected. The sealing block 2 is formed as one body, and after the sealing part 134 is placed on a top surface of a die, the heat and pressure may be applied to the top surface of the sealing part 134 by the sealing block 2. However, the embodiment is not limited thereto. The sealing block 2 is formed as two bodies and may apply the heat and pressure to top surface and the bottom surface of the sealing part 134, respectively.

The sealing part 134 extends outward from edges of the cup part 133. Thus, the sealing part 134 may be formed along the edges of the secondary battery 1. Therefore, it is desirable that the sealing block 2 simultaneously seals the sealing part 134 formed along at least one of the edges of the secondary battery 1. Accordingly, times and processes may be saved, the sealing part 134 may have aesthetically pleasing appearance, and a sealing force of the sealing part 134 may be uniform. For this, as illustrated in FIG. 5, it is desirable that the main body 21 of the sealing block 2 has a width greater than or equal to a width of the sealing part 134 and a length greater than or equal to a length of the sealing part 134.

Figure 6:
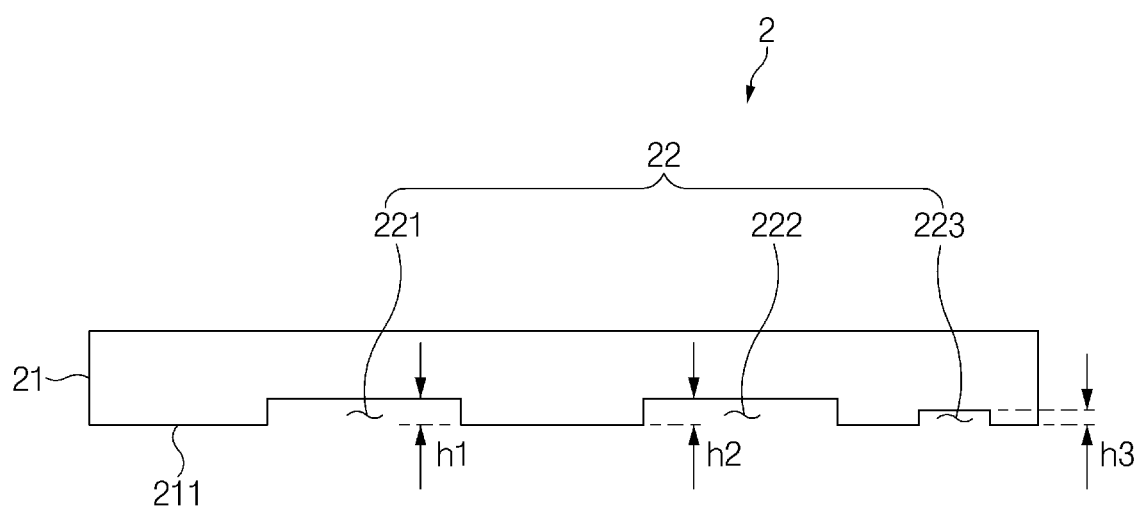
FIG. 6 is a front view of a sealing block of FIG. 5.

FIG. 6 is a front view of the sealing block 2 according to an embodiment of the present invention.

The sealing block 2 includes the groove 22 which is recessed inward from the sealing surface 211 of the main body 21. When the sealing block 2 comes into contact with the top surface of the sealing part 134 and then applies the heat and pressure thereto, the sealing surface 211 may be a bottom surface of the sealing block 2 as illustrated in FIG. 6.

The groove 22 includes the vent groove 224 (illustrated in FIG. 7) into which the venting device 15 is inserted when the sealing surface 211 comes into contact with the sealing part 134 and which seals the venting device 15 together with the sealing part 134. The vent groove 224 will be described in detail later.

The groove 22 also includes the weak sealing groove 223 which is positioned between the vent groove 224 and the cup part 133 when the sealing surface 211 comes into contact with the sealing part 134.

When the sealing surface 211 of the sealing block 2 comes into contact with the sealing part 134, a portion of the sealing part 134 corresponding to the weak sealing groove 223 is heated and pressed relatively more weakly than other peripheral regions of the sealing part 134. In particular, the portion of the sealing part 134 does not come into direct contact with the sealing surface 211 due to the weak sealing groove 223 in an initial stage of a sealing process, but the portion of the sealing part 134 is spaced apart therefrom to a small extent and forms a space. Thus, the other peripheral regions of the sealing part 134 are directly heated and pressed. On the other hand, the portion of the sealing part 134 is not directly pressed, but heated through the convection or radiation method. Also, when the sealing process proceeds to some extent, the sealant layer 1353 in the other peripheral regions of the sealing part 134 is melt to some extent, and thus, the overall thickness of the sealing part 134 decreases. On the other hand, the portion of the sealing part 134 is relatively less melted. Thus, the thickness of the portion is not significantly reduced, and the portion is inserted into the weak sealing groove 223. Thus, when the sealing process is complete, the portion of the sealing part 134 is very weakly pressed and heated and thus weakly sealed. Accordingly, the portion becomes the weak sealing portion 1343.

When a height h3 of the weak sealing groove 223 is excessively large, little heat and pressure are applied, and thus, the weak sealing portion 1343 is not sealed at all. On the other hand, when the height h3 of the weak sealing groove 223 is excessively small, a large amount of heat and pressure is applied, and thus, the sealing force of the weak sealing portion 1343 increases. Thus, it is desirable that the height h3 of the weak sealing groove 223 corresponds to a change in thickness of the sealing part 134 that changes before and after the sealing process. Here, they correspond to each other represents that they are similar or identical.

The groove 22 may include the lead groove 22 into which the electrode lead 12 is inserted when the sealing surface 211 comes into contact with the sealing part 134 and which seals the electrode lead 12 together with the sealing part 134. As described above, the electrode lead 12 has its own constant physical volume. However, when the lead groove 22 is not formed in the sealing block 2, the sealing block 2 may not uniformly come into contact with the sealing part 134 overall due to the electrode lead 12. Thus, the heat and pressure may not be uniformly applied to the sealing part 134.

According to an embodiment of the present invention, when the sealing surface 211 comes into contact with the sealing part 134, the electrode lead 12 and the sealing part 134 surrounding the electrode lead 12 are inserted into the lead groove 22. Accordingly, the sealing block 2 uniformly comes into contact with the sealing part 134 overall, and thus, the heat and pressure may be uniformly applied to the sealing part 134. Also, the electrode lead 12 and the sealing part 134 surrounding the electrode lead 12 are inserted into the lead groove 22, and thus, the sealing is uniformly made along the periphery of the electrode lead 12. Accordingly, a tight lead sealing portion (not shown) may be formed.

It is desirable that heights h1 and h2 of the lead groove 22 have the heights that allow the electrode lead 12 and the sealing part 134 surrounding the electrode lead 12 to be easily inserted into the lead groove 22 and come into contact with the top surface of the lead groove 22. For example, when the sealing block 2 has two parts to press and heat the top and bottom surfaces of the sealing part 134, respectively, it is desirable that heights h1 and h2 of one lead groove 22 is half the thickness of the electrode lead 12.

It is desirable that the shape and width of the lead groove 22 correspond to the shape and width of the electrode lead 12. Here, their shapes correspond to each other represents that they are same or similar. Thus, when the top surface of the electrode lead 12 is formed to be flat, the top surface of the lead groove 22 may also be formed to be flat. Also, their widths correspond to each other represents that a width is identical or similar to the width of the sealing part 134 surrounding the electrode lead 12. Thus, the electrode lead 12 and the sealing part 134 surrounding the electrode lead 12 may be easily inserted into the lead groove 22.

Here, as described above, it is desirable that the height h3 of the weak sealing groove 223 corresponds to a change in thickness of the sealing part 134. However, a change in thickness of the sealing part 134 is smaller than the thickness of the electrode lead 12. Thus, as illustrated in FIG. 6, it is desirable that the height h3 of the weak sealing groove 223 is smaller than each of the heights h1 and h2 of the lead groove 22.

Figure 7:
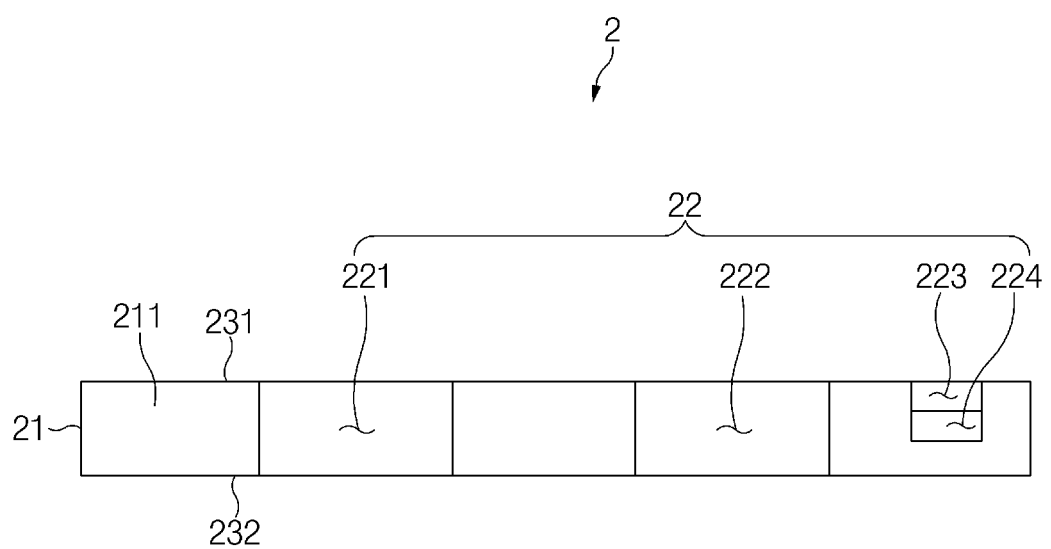
FIG. 7 is a bottom view of a sealing block of FIG. 5.

The sealing part 134 may include a positive electrode lead sealing portion (not shown) into which the positive electrode lead 121 is inserted and a negative electrode lead sealing portion (not shown) into which the negative electrode lead 122 is inserted. Also, as described above, the positive electrode lead 121 and the negative electrode lead 122 may extend in various directions. When the positive electrode lead 121 and the negative electrode lead 122 extend in the same direction as illustrated in FIG. 5, it is desirable that one sealing block 2 simultaneously seals the sealing part 134 into which the positive electrode lead 121 and the negative electrode lead 122 are inserted together. Thus, as illustrated in FIGS. 6 and 7, a positive electrode lead groove 221 for sealing the positive electrode lead 121 together with the sealing part 134 and a negative electrode lead groove 222 for sealing the negative electrode lead 122 together with the sealing part 134 may be formed in the one sealing block 2. Alternatively, when the positive electrode lead 121 and the negative electrode lead 122 extend in different directions, the positive electrode lead groove 221 is formed in one sealing block 2, and the negative electrode lead groove 222 may be formed in another sealing block 2. In addition, when the positive electrode lead 121 and the negative electrode lead 122 extend in directions perpendicular to each other, one sealing block 2 may be bent to simultaneously seal the sealing part 134 positioned in two directions. In this case, both the positive electrode lead groove 221 and the negative electrode lead groove 222 may be formed in the one sealing block 2.

The heights h1 and h2 of the lead groove 22 may be different from each other according to the thickness of the electrode lead 12. When the positive electrode lead 121 and the negative electrode lead 122 have the same thickness, the height h1 of the positive electrode lead groove 221 may also be the same as the height h2 of the negative electrode lead groove 222. When the positive electrode lead 121 and the negative electrode lead 122 have different thicknesses, the height h1 of the positive electrode lead groove 221 may also be different from the height h2 of the negative electrode lead groove 222. In particular, the negative electrode lead 122 may be formed to be thicker than the positive electrode lead 121 to reduce an amount of heat generated. In this case, the height h2 of the negative electrode lead groove 222 may be greater than the height h1 of the positive electrode lead groove 221.

FIG. 7 is a bottom view of a sealing block 2 according to an embodiment of the present invention.

The lead groove 22 may be lengthily formed, in a width direction of the sealing surface 211, from a first edge 231 of the sealing block 2 that is formed in a longitudinal direction of the sealing surface 211. In particular, it is desirable that the lead groove 22 extends to a second edge 232 facing the first edge 231. That is, the lead groove 22 may be formed from the first edge 231 to the second edge 232 of the sealing block 2 while passing therethrough in the width direction. The electrode lead 12 protrudes outward to supply the electricity to the outside and is longer than the sealing part 134. Here, the lead groove 22 is formed to pass through the sealing block 2 in the width direction of the sealing block 2. Thus, although the electrode lead 12 protrudes, the electrode lead 12 may not interfere with the formation of a lead sealing portion (not shown).

Also, the groove 22 may further include the vent groove 224 into which the venting device 15 is inserted when the sealing surface 211 comes into contact with the sealing part 134 and which seals the venting device 15 together with the sealing part 134. Like the electrode lead 12, the venting device 15 also has its own constant physical volume. However, when the vent groove 224 is not formed in the sealing block 2, the sealing block 2 may not uniformly come into contact with the sealing part 134 overall due to the venting device 15. Thus, the heat and pressure may not be uniformly applied to the sealing part 134.

According to an embodiment of the present invention, when the sealing surface 211 comes into contact with the sealing part 134, the venting device 15 and the sealing part 134 surrounding the venting device 15 are inserted into the vent groove 224. Accordingly, the sealing block 2 uniformly comes into contact with the sealing part 134 overall, and thus, the heat and pressure may be applied to the sealing part 134 uniformly. Also, the venting device 15 and the sealing part 134 surrounding the venting device 15 are inserted into the vent groove 224, and thus, the sealing is uniformly made along the periphery of the venting device 15. Accordingly, the tight vent sealing portion 1344 may be formed.

It is desirable that the vent groove 224 has a height that allows the venting device 15 and the sealing part 134 surrounding the venting device 15 to be easily inserted into the vent groove 224 and come into contact with the top surface of the vent groove 224. For example, when the sealing block 2 has two parts to press and heat the top and bottom surfaces of the sealing part 134, respectively, it is desirable that a height of one vent groove 224 is half the thickness of the venting device 15.

It is desirable that the shape and size of the vent groove 224 correspond to the shape and size of the venting device 15. Here, their shapes correspond to each other represents that they are same or similar. Thus, when the top surface of the venting device 15 is formed to have an arch shape, the top surface of the vent groove 224 may also be formed to have an arch shape. Also, their sizes correspond to each other represents that a width is identical or similar to the size of the sealing part 134 surrounding the venting device 15. Thus, the venting device 15 and the sealing part 134 surrounding the venting device 15 may be easily inserted into the vent groove 224.

When the venting device 15 is inserted into the same side of the sealing part 134 as the side in which the electrode lead 12 is formed, it is desirable that one sealing block 2 simultaneously seals the sealing part 134 into which the electrode lead 12 and the venting device 15 are inserted together. Thus, as illustrated in FIGS. 6 and 7, both the vent groove 224 and the lead groove 22 may be formed in the one sealing block 2.

Also, as described above, it is desirable that the weak sealing portion 1343 has a width corresponding to a width of the vent sealing portion 1344 so that the gas inside the cup part 133 is easily guided to the venting device 15. Here, the size of the weak sealing portion 1343 is determined depending on the size of the weak sealing groove 223, and the size of the vent sealing portion 1344 is determined depending on the size of the vent groove 224. Thus, as illustrated in FIG. 7, it is desirable that the width of the weak sealing groove 223 corresponds to the width of the vent groove 224. Here, their widths correspond to each other represents that they are same or similar.

Also, as described above, the weak sealing portion 1343 is positioned between the vent sealing portion 1344 and the cup part 133. Thus, as illustrated in FIG. 7, the weak sealing groove 223 that forms the weak sealing portion 1343 may be formed from the first edge 231 of the sealing block 2 that is formed in the longitudinal direction of the sealing surface 211 to the vent groove 224 that forms the vent sealing portion 1344.

Figure 8:
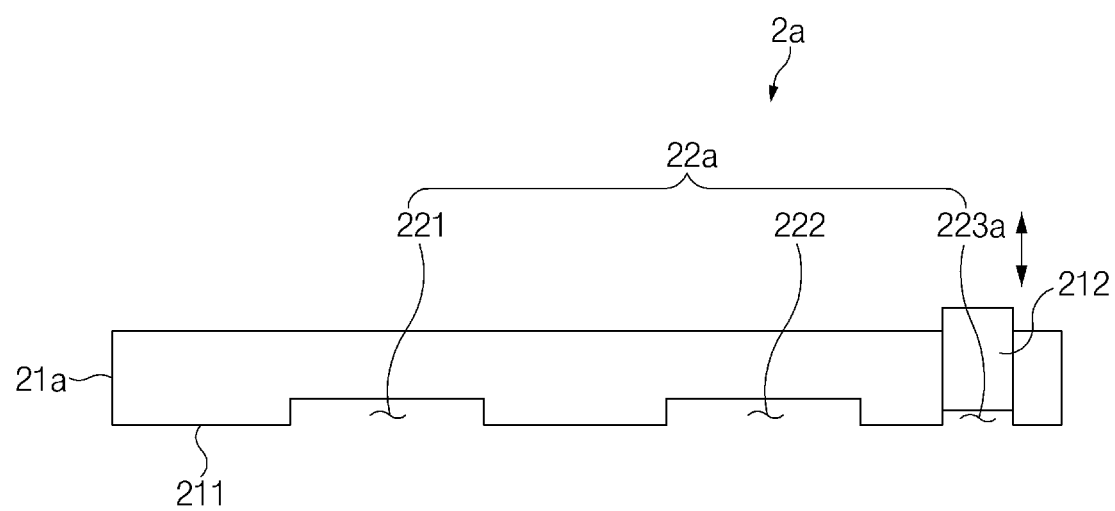
FIG. 8 is a front view of a sealing block according to another embodiment of the present invention.

FIG. 8 is a front view of a sealing block 2a according to another embodiment of the present invention.

According to the embodiment of the present invention, the height h3 of the weak sealing groove 223 of the sealing block 2 is fixed. However, according to another embodiment of the present invention, a main body 21a of the sealing block 2a further includes a cylinder 212 which is disposed above a weak sealing groove 223a, moves linearly in a vertical direction, and adjusts a height h3 of the weak sealing groove 223a.

When a sealing surface 211 of the sealing block 2a comes into contact with the sealing part 134, a portion of the sealing part 134 corresponding to the weak sealing groove 223a does not come into direct contact with the sealing surface 211 due to the weak sealing groove 223a in an initial stage of a sealing process, but is spaced apart therefrom to a small extent and forms a space. Also, when the cylinder 212 linearly moves downward, the distance between the cylinder 212 and the portion of the sealing part 134 is reduced as the height h3 of the weak sealing groove 223a becomes smaller. Here, an amount of heat applied to the portion of the sealing part 134 increases. When the cylinder 212 comes into contact with the portion of the sealing part 134 as the cylinder 212 linearly moves further downward, the heat is directly transferred by a conduction method, and thus, an amount of heat being applied further increases. Also, the pressure of the cylinder 212 is also transferred. When the sealing process is complete, the portion of the sealing part 134 becomes the weak sealing portion 1343.

When the cylinder 212 stops the linear movement in a state where the cylinder 212 is far away from the portion of the sealing part 134, the sealing force of the weak sealing portion 1343 becomes very small after the sealing process is complete. On the other hand, when the cylinder 212 stops the linear movement in a state where the cylinder 212 is close to or in contact with the portion of the sealing part 134, the sealing force of the weak sealing portion 1343 becomes very large after the sealing process is complete. Therefore, the sealing force of the weak sealing portion 1343 may be easily regulated by adjusting the degree of the linear movement of the cylinder 212.

Those with ordinary skill in the technical field to which the present invention pertains will understand that the present invention may be carried out in other specific forms without changing the technical idea or essential features. Thus, the above-described embodiments are to be considered illustrative and not restrictive to all aspects. The scope of the present invention is defined by the appended claims rather than the foregoing description and the exemplary embodiments described therein. Various modifications made within the meaning and scope of claims and equivalent concepts of the claims are included in the scope of the present invention.

The invention claimed is:

1. A secondary battery comprising:
an electrode assembly including an electrode and a separator; and
a pouch-type battery case to accommodate the electrode assembly therein,
wherein the pouch-type battery case comprises:
a cup part with an accommodation space to accommodate the electrode assembly therein;
a sealing part extending outward from the cup part, the sealing part including upper and lower portions, the upper and lower portion configured to form a first seal by contacting each other; and
a venting device inserted into the sealing part such that the venting device is fully encased within the sealing part, the venting device configured to discharge a gas from the cup part to an outside,
wherein the sealing part comprises:
a vent sealing portion into which the venting device is inserted; and
a weak sealing portion positioned between the vent sealing portion and the cup part, a sealing strength of the weak sealing portion being less than the first seal.

2. The secondary battery of claim 1, wherein the weak sealing portion has a width corresponding to a width of the vent sealing portion.

3. A sealing block to seal a sealing part of a pouch-type secondary battery, the sealing block comprising:
a main body including a plurality of grooves recessed inward from a sealing surface of the main body, the sealing surface configured to directly contact an external surface of a sealing part of a pouch-type secondary battery,
wherein the plurality of grooves comprises:
a vent groove configured to receive a venting device that discharges a gas inside a cup part of the pouch-type secondary battery to an outside, the vent groove configured to seal the venting device to the sealing part; and
a weak sealing groove configured to be positioned between the vent groove and the cup part when the sealing surface contacts the external surface of the sealing part.

4. The sealing block of claim 3, wherein the main body includes a lead groove to receive an electrode lead supplying electricity to the outside of the pouch-type secondary battery, the lead groove configured to seal the electrode lead to the sealing part.

5. The sealing block of claim 4, wherein the weak sealing groove has a height less than that of the lead groove.

6. The sealing block of claim 4, wherein the lead groove extends from a first edge in a width direction of the sealing surface, the first edge extending in a longitudinal direction of the sealing surface.

7. The sealing block of claim 6, wherein the lead groove extends to a second edge facing the first edge.

8. The sealing block of claim 3, wherein the weak sealing groove has a width corresponding to a width of the vent groove.

9. The sealing block of claim 3, wherein the weak sealing groove extends from a first edge to the vent groove, the first edge extending in a longitudinal direction of the sealing surface.

10. The sealing block of claim 3, wherein the main body has a width greater than or equal to a width of the sealing part and a length greater than or equal to a length of the sealing part.

11. The sealing block of claim 3, wherein the main body further comprises a cylinder disposed in the weak sealing groove, the cylinder configured to move linearly in a vertical direction to adjust a height of the weak sealing groove.

\* \* \* \* \*